United States Patent
Sambo et al.

(10) Patent No.: US 10,839,683 B2
(45) Date of Patent: Nov. 17, 2020

(54) IDENTIFYING WRONG-WAY TRAVEL EVENTS

(71) Applicants: VERIZON CONNECT IRELAND LIMITED, Sandyford Dublin (IE); VERIZON PATENT AND LICENSING INC., Basking Ridge, NJ (US)

(72) Inventors: Francesco Sambo, Padua (IT); Luca Bravi, Scandicci (IT); Samuele Salti, Prato (IT); Leonardo Taccari, Florence (IT); Matteo Simoncini, Pistoia (IT); Alessandro Lori, Florence (IT); Leonardo Sarti, Sesto Fiorentino (IT); Jason M. Koch, Huntington Beach, CA (US)

(73) Assignees: Verizon Connect Ireland Limited, Dublin (IE); Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/542,775

(22) Filed: Aug. 16, 2019

(65) Prior Publication Data
US 2019/0371168 A1 Dec. 5, 2019

Related U.S. Application Data

(63) Continuation of application No. 15/905,506, filed on Feb. 26, 2018, now Pat. No. 10,417,909.

(51) Int. Cl.
*G08G 1/0967* (2006.01)
*G08G 1/056* (2006.01)
(Continued)

(52) U.S. Cl.
CPC ....... *G08G 1/0967* (2013.01); *G01C 21/3676* (2013.01); *G08G 1/015* (2013.01); *G08G 1/056* (2013.01); *G08G 1/20* (2013.01)

(58) Field of Classification Search
CPC ...... G08G 1/0967; G08G 1/015; G08G 1/056; G08G 1/20; G01C 21/3676; G01C 21/3679
(Continued)

(56) References Cited

U.S. PATENT DOCUMENTS

| | | |
|---|---|---|
| 5,745,865 A | 4/1998 | Rostoker |
| 8,421,648 B2 | 4/2013 | Konaka et al. |

(Continued)

OTHER PUBLICATIONS

Haendeler et al., "Passive detection of wrong way drivers on motorways based on low power wireless communications", Communication Networks Institute (CNI), May 2014, 5 pages.

(Continued)

*Primary Examiner* — Emily C Terrell

(57) ABSTRACT

A device can obtain acceleration data and GPS location data. The GPS location data can include a plurality of GPS location data samples relating to vehicles. The acceleration data can include a plurality of acceleration data samples relating to one or more of the vehicles. The device can determine, using the plurality of acceleration data samples or the plurality of GPS location data samples, a potential wrong-way travel event associated with a vehicle, determine whether the vehicle is associated with an industry in which vehicles legitimately engage in wrong-way travel after determining the potential wrong-way travel event, and perform one or more actions to cause information regarding the potential wrong-way travel event to be provided to a user device based on determining the potential wrong-way travel event and determining whether the vehicle is associated with an industry in which vehicles legitimately engage in wrong-way travel.

20 Claims, 10 Drawing Sheets

(51) Int. Cl.
*G08G 1/00* (2006.01)
*G01C 21/36* (2006.01)
*G08G 1/015* (2006.01)

(58) Field of Classification Search
USPC ........................................................ 340/905
See application file for complete search history.

(56) References Cited

U.S. PATENT DOCUMENTS

| | | | |
|---|---|---|---|
| 8,428,861 | B1 | 4/2013 | Williams et al. |
| 8,947,259 | B2 | 2/2015 | Tagawa et al. |
| 9,767,686 | B2 * | 9/2017 | Jeschke .............. G01C 21/3697 |
| 2005/0065711 | A1 | 3/2005 | Dahlgren |
| 2005/0090982 | A1 | 4/2005 | Mead |
| 2011/0121992 | A1 | 5/2011 | Konaka |
| 2013/0162448 | A1 * | 6/2013 | Mochizuki ....... G08G 1/096775 340/905 |
| 2013/0234892 | A1 | 9/2013 | Povolny et al. |
| 2014/0022390 | A1 | 1/2014 | Blank |
| 2014/0350837 | A1 * | 11/2014 | Galbas ................. B60W 30/09 701/301 |
| 2015/0325123 | A1 | 11/2015 | Gueziec |
| 2018/0281782 | A1 * | 10/2018 | Salter ................. B60W 30/146 |

OTHER PUBLICATIONS

Monteiro et al., "Wrong Way Drivers Detection Based on Optical Flow", Institute for Systems and Robotics, 2007, 4 pages.

* cited by examiner

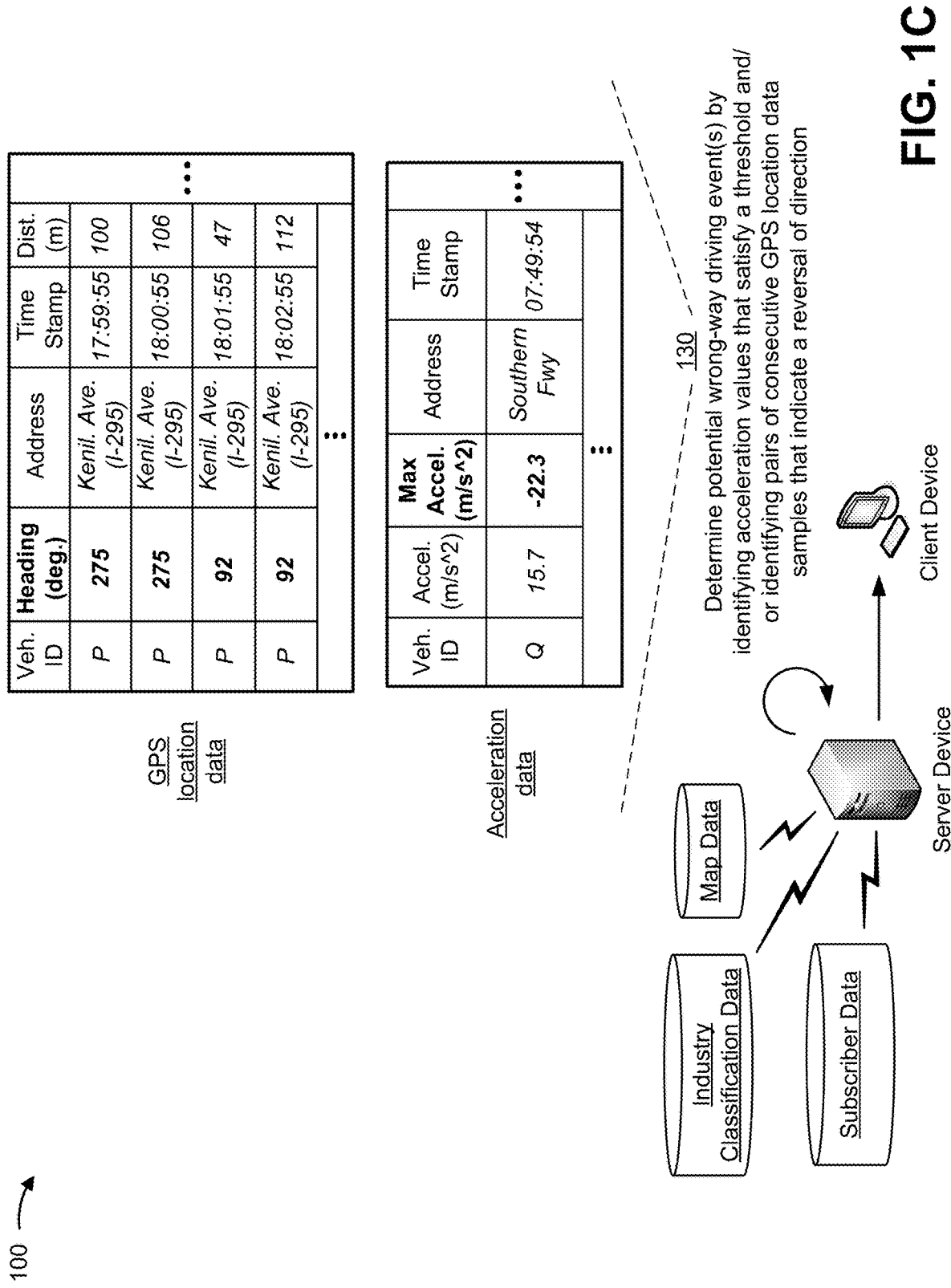

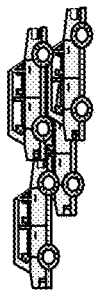

Vehicle P

GPS location data

| Veh. ID | Heading (deg.) | Address | Time Stamp | Dist. (m) |
|---|---|---|---|---|
| P | 275 | Kenil. Ave. (I-295) | 17:59:55 | 100 |
| P | 275 | Kenil. Ave. (I-295) | 18:00:55 | 106 |
| P | 92 | Kenil. Ave. (I-295) | 18:01:55 | 47 |
| P | 92 | Kenil. Ave. (I-295) | 18:02:55 | 112 |
| ... | | | | | vs

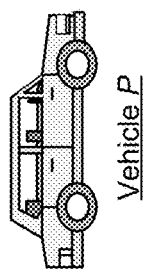

Other vehicles previously located at or near the same area

| Veh. ID | Heading (deg.) | Address | Time Stamp | Dist. (m) |
|---|---|---|---|---|
| A | 92 | Kenil. Ave. Fwy (I-295) | 10:34:29 | 18 |
| C | 92 | Kenil. Ave. Fwy (I-295) | 02:56:10 | 27 |
| F | 92 | Kenil. Ave. Fwy (I-295) | 19:38:12 | 125 |
| W | 92 | Kenil. Ave. Fwy (I-295) | 04:45:42 | 37 |
| ... | | | | |

140 -- Compare heading values relating to vehicle P and heading values relating to other vehicles previously located at or near the street address to determine whether vehicle P was likely in the wrong direction

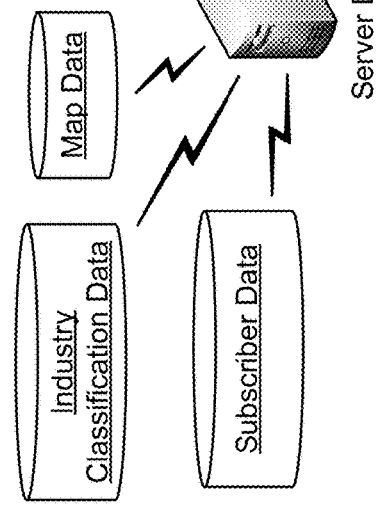

FIG. 1D

IDENTIFYING WRONG-WAY TRAVEL EVENTS

CROSS REFERENCE TO RELATED APPLICATION

This application is a continuation of U.S. patent application Ser. No. 15/905,506 filed Feb. 26, 2018, the content of which is herein incorporated by reference in its entirety.

BACKGROUND

Driving the wrong way (e.g., against the direction of traffic) often occurs as the result of driver inattention, confusing roads, or insufficient road signage. Wrong-way driving, particularly on or near highways, is especially dangerous given that vehicles are usually traveling at very high speeds in such areas.

BRIEF DESCRIPTION OF THE DRAWINGS

FIGS. 1A-1E are diagrams of an overview of an example implementation described herein;

DETAILED DESCRIPTION OF PREFERRED EMBODIMENTS

Figure 1A:
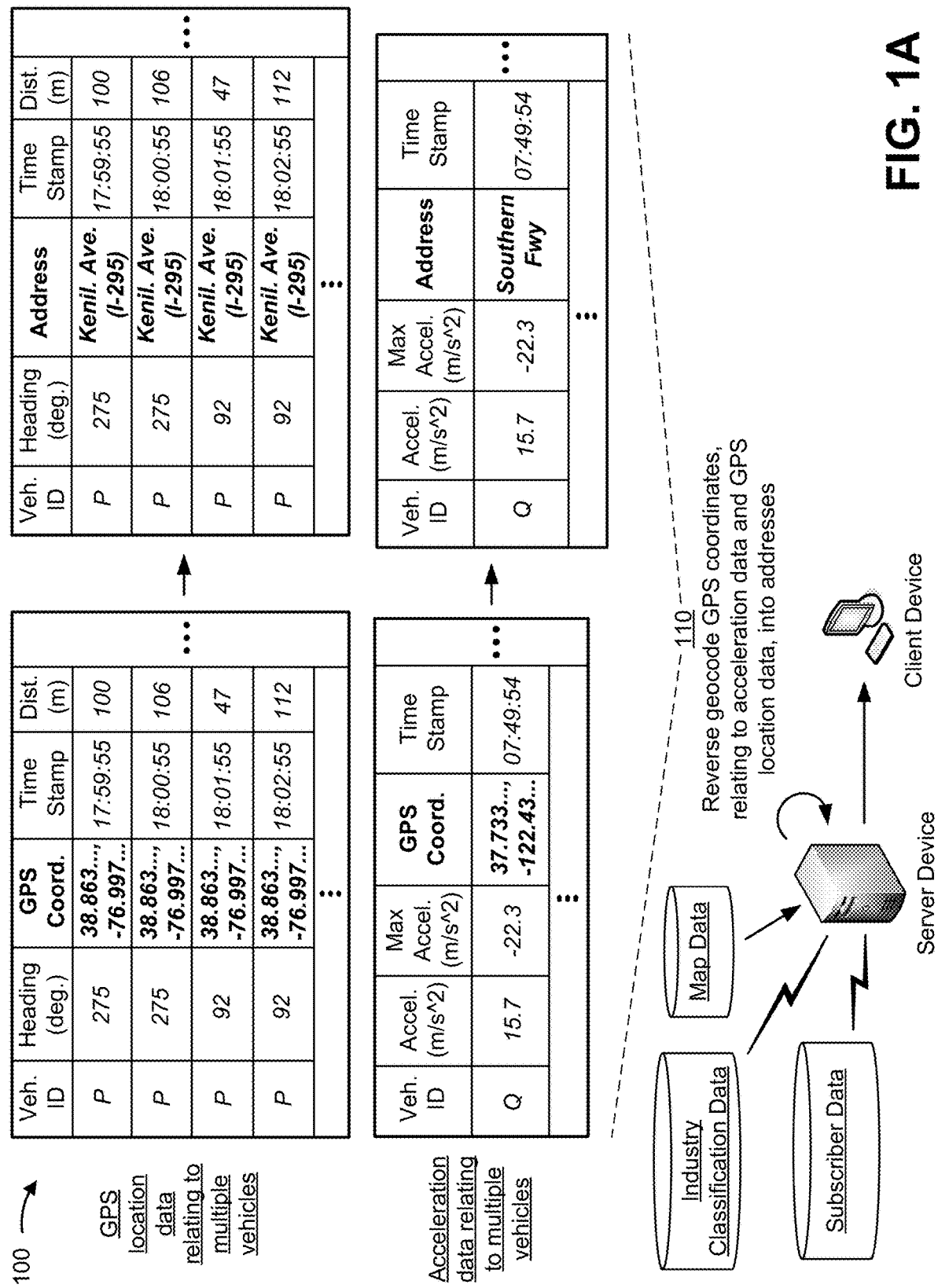

The following detailed description of example implementations refers to the accompanying drawings. The same reference numbers in different drawings can identify the same or similar elements.

Drivers, such as those who drive for fleets (e.g., trucking companies, delivery companies, and/or the like), sometimes drive against the direction of traffic. This can be dangerous to the drivers as well as to others on the road (e.g., other drivers, pedestrians, and/or the like). In many cases, a driver might not be aware that the driver is going the wrong way until the driver has traveled a significant distance and/or an accident occurs. A fleet manager might also not be able to detect occurrences of wrong-way driving, and thus might not be aware of the risks created by certain drivers, and might have limited data that can be used to train the fleet's drivers on how to avoid such driving.

Some implementations, described herein, provide a device (e.g., a server device) that is capable of analyzing and filtering a large set of vehicle acceleration data or global positioning system (GPS) location data, based on threshold values, street address information, vehicle industry classifications, and/or subscriber information to identify wrong-way travel events. In some implementations, the device is capable of providing information regarding identified wrong-way travel events to the associated drivers, to fleet manager(s) associated with the drivers, to local authorities associated with locations relating to the identified wrong-way travel events, to other drivers on the road, and/or the like. In this way, drivers and/or fleet managers can be alerted to wrong-way travel events, which aids drivers in avoiding similar events, and facilitates fleet managers in training drivers on driver safety (thereby reducing the risk of accidents, and reducing a need for fleet managers to expend resources, such as network and/or communication resources that might otherwise be needed in a case where an accident occurs due to a wrong-way travel event (e.g., to mitigate the severity of an accident and/or to dispatch fleet personnel to assist the driver at the location of the accident)). Furthermore, local authorities can be alerted to areas where wrong-way travel events have occurred or are frequent, which permits the local authorities to address any issues there might be with road markings and/or signage (thereby generally improving road safety).

FIGS. 1A-1E are diagrams of an overview of an example implementation 100 described herein. As shown in FIGS. 1A-1E, example implementation 100 can include a server device and a client device in communication with the server device. In some implementations, the server device can provide navigation service(s) to one or more subscribers (e.g., delivery companies, trucking companies, and/or other types of companies that operate fleets of vehicles). In some implementations, the server device can be implemented as a fleet management platform, and can receive, store, access, and/or maintain information associated with vehicles, such as GPS location data and acceleration data.

In some implementations, the acceleration data and/or the GPS location data can include historical driving-related data and/or real-time (or near real-time) driving-related data provided by the vehicles. For example, the acceleration data and/or the GPS location data can include driving-related data provided by one or more devices included in the vehicles, such as telematics device(s), including accelerometer(s), GPS device(s), other vehicle sensors, and/or the like. In a case where the server device provides navigation service(s) to one or more subscribers, the acceleration data and/or the GPS location data can include historical driving-related data and/or real-time (or near real-time) driving-related data provided by one or more vehicles associated with the subscriber(s).

In some implementations, the acceleration data can include acceleration data samples provided by the vehicles (e.g., via messages). In some implementations, an acceleration data sample can include an acceleration value corresponding to a vehicle (e.g., provided by an accelerometer of the vehicle). Additionally, and in some implementations, an acceleration data sample can include an identifier associated with the vehicle (e.g., a subscriber ID, a subscriber name (e.g., a company name), and/or the like), a time stamp corresponding to a time at which the acceleration value is detected and/or recorded, location data (e.g., GPS coordinates provided by a navigation device of the vehicle) regarding a location of the vehicle at which the acceleration value is detected and/or recorded, and/or the like.

In some implementations, a vehicle can provide acceleration data samples periodically (e.g., one sample per unit time, such as once per 10 seconds, once per minute, once per three minutes, and/or the like), continuously, and/or the like. Additionally, or alternatively, a vehicle can provide acceleration data samples when one or more conditions are satisfied. For example, a vehicle can provide an acceleration data sample based on a high acceleration (or high deceleration) event (e.g., a harsh braking event, a quick start event, a cornering event, and/or the like). In some implementations, and in a case where a vehicle provides acceleration data based on a high acceleration (or high deceleration) event, the vehicle can include a maximum acceleration value (or a maximum deceleration value) detected and/or recorded for the event.

In some implementations, the GPS location data can include GPS location data samples provided by the vehicles (e.g., via messages). In some implementations, a vehicle can provide GPS location data samples periodically (e.g., once sample per unit time, such as once per 10 seconds, once per minute, once per three minutes, and/or the like), continuously, and/or the like. In some implementations, a GPS location data sample can include location data (e.g., GPS coordinates provided by a navigation device of the vehicle) regarding a location of a vehicle, and a heading value (a direction) of the vehicle detected and/or recorded at the location. In some implementations, a heading value can be represented in degrees (e.g., where 0 degrees can correspond to north, 90 degrees can correspond to east, etc.).

Additionally, and in some implementations, a GPS location data sample can include an identifier associated with the vehicle (e.g., a subscriber ID, a subscriber name (e.g., a company name), a vehicle ID, and/or the like), a time stamp, information regarding a distance traveled by the vehicle after an immediately preceding GPS location data sample was recorded and/or provided, a speed of the vehicle, and/or the like.

As shown in FIG. 1A, the server device can store, access, and/or maintain acceleration data samples and GPS location data samples (e.g., including the various data items described above, such as maximum acceleration or deceleration values, heading values, time stamps, GPS coordinates, etc.) for multiple vehicles.

As shown, the server device can additionally have access to map data (e.g., cartographic data that includes GPS coordinate information and corresponding street address information), industry classification data (e.g., codes assigned to different industries by a government authority (e.g., Standard Industrial Classification (SIC) codes used in the United States) and/or the like), and subscriber data (e.g., data relating to each subscriber of service(s) provided by the server device, such as a company name, an industry classification code (e.g., a SIC code), and/or the like).

As shown in FIG. 1A, and as shown by reference number 110, the server device can reverse geocode GPS coordinates, included in acceleration data samples and GPS location data samples, into street addresses. In some implementations, the server device can perform one or more reverse geocode lookup operations by using the map data. As shown, the server device can determine that, for various GPS location data samples relating to a vehicle P, the GPS coordinates "38.863 . . . , −76.997 . . . " correspond to the street address "Kenil. Ave. (I-295)," and that, for an acceleration data sample relating to a vehicle Q, the GPS coordinates "37.733 . . . , −122.43 . . . " correspond to the street address "Southern Fwy."

Figure 1B:
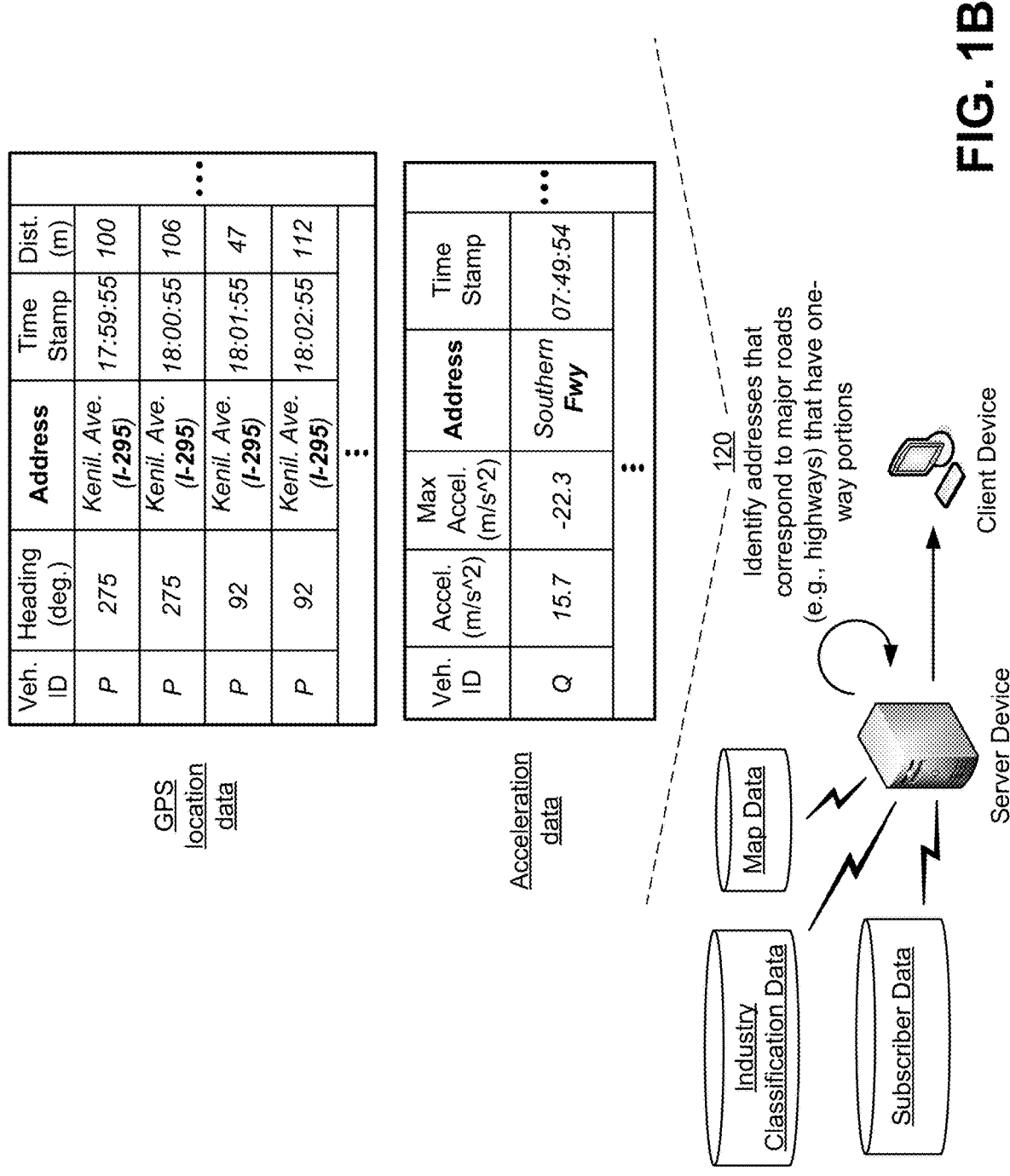

As shown in FIG. 1B, and as shown by reference number 120, the server device can identify street addresses (e.g., via text mining) that correspond to major roads (e.g., highways and/or the like) that have one-way portions where wrong-way driving might occur. For example, the server device can identify, from the reverse geocoded addresses associated with the acceleration data and/or the GPS location data, street addresses that contain one or more strings or designators corresponding to major roads (e.g., "hwy," "fwy," "I-," "US-," numbers in the street name, and/or the like for roads in the United States, or the same, similar, or other appropriate strings or designators for roads in other countries). As shown, for example, the server device can identify, based on the reverse geocoded address "Kenil. Ave. (I-295)," associated with GPS location data samples relating to vehicle P, as corresponding to a major road (e.g., based on the "I-" designator in the reverse geocoded address), and can identify, based on the reverse geocoded address "Southern Fwy," associated with an acceleration data sample relating to vehicle Q, as corresponding to a major road (e.g., based on the "Fwy" designator in the reverse geocoded address). In this way, the server device can narrow down the acceleration data and/or the GPS location data to that which is associated with roads that might be prone to wrong-way driving events.

As shown in FIG. 1C, and as shown by reference number 130, the server device can determine potential wrong-way driving event(s) by identifying, from the acceleration data, acceleration values (e.g., maximum acceleration or deceleration values) that satisfy a threshold. In some implementations, the threshold can be a value that is based on a multiple of the Earth's gravitational force (e.g., $2*g$ (or $2*9.81$ m/s$^2$)=19.62 m/s$^2$ and/or the like) to enable detection of vehicle crashes (e.g., which typically involve high vehicle decelerations) that might be due to wrong-way driving. Here, for example, the server device can identify that a maximum acceleration value of −22.3 m/s$^2$, specified in an acceleration data sample relating to vehicle Q, satisfies the threshold (e.g., that an absolute value of −22.3 m/s$^2$ exceeds the threshold), and determine, based on this identification, that vehicle Q potentially engaged in a wrong-way driving event.

As also shown by reference number 130, the server device can additionally, or alternatively, determine potential wrong-way driving event(s) by identifying, from the GPS location data, pairs of consecutive GPS location data samples that indicate a reversal of direction, which might be the result of drivers turning vehicles around due to wrong-way driving. For example, the server device can identify pairs of consecutive GPS location data samples where a difference, between heading values specified in each such pair of consecutive GPS location data samples, is 180 degrees or is within a threshold quantity of degrees from 180 degrees (e.g., is within a margin of tolerance of plus/minus 15 degrees, 20 degrees, and/or the like from 180 degrees). In some implementations, and for increased robustness of the determination, the server device can additionally compare heading values specified in each such pair of consecutive GPS location data samples and heading values specified in one or more adjacent GPS location data samples (e.g., adjacent to the pair of consecutive GPS location data samples) relating to the same vehicle for further evidence of a reversal of direction of the vehicle. Here, for example, the server device can determine that vehicle P potentially engaged in a wrong-way driving event, since heading values, specified in a pair of consecutive GPS location data samples relating to vehicle P, change from 275 degrees to 92 degrees between a time 18:00:55 and a time 18:01:55 (i.e., a difference of 183 degrees), a heading value of 275 degrees specified in an adjacent GPS location data sample at a time 17:59:55 is consistent with the heading value of 275 degrees at the time 18:00:55, and a heading value of 92 degrees specified in an adjacent GPS location data sample at a time 18:02:55 is consistent with the heading value of 92 degrees at the time 18:01:55.

In this way, the server device can identify a subset of the acceleration data and/or a subset of the GPS location data (e.g., which might overlap) that might each include data corresponding to one or more potential wrong-way driving events. Although only acceleration data samples relating to vehicle Q and GPS location data samples relating to vehicle P are described above, the server device can perform the above-described determinations, relating to maximum acceleration or deceleration value(s), using acceleration data samples provided by other vehicles, and can perform the above-described determinations, relating to differences in heading values, using pairs of consecutive GPS location data samples provided by other vehicles.

As shown in FIG. 1D, and as shown by reference number 140, the server device can compare heading values relating to vehicle P and heading values relating to other vehicles that were previously located at (or near) the location corresponding to the potential wrong-way driving event associated with vehicle P (e.g., that were previously located within a virtual boundary of the location) to determine whether the potential wrong-way driving event might need to be excluded from further consideration (e.g., to possibly filter events that are not likely wrong-way driving events, such as where a vehicle passes through acceleration and deceleration roadway junctions).

Here, for example, the server device can determine, from GPS location data samples relating to vehicles A, C, F, and W, that each of such vehicles had a heading value of 92 degrees when the vehicle was located at (or near) the location corresponding to the potential wrong-way driving event associated with vehicle P (e.g., a heading value that is opposite, or near opposite, to that of vehicle P prior to vehicle P's reversal of direction), and thus vehicle P was likely going the wrong way. In some implementations, the server device can perform the determination by comparing heading values, relating to vehicle P, and a median, a mean, and/or the like of heading values relating to the other vehicles. Additionally, or alternatively, and in some implementations, the server device can perform the determination by comparing heading values relating to vehicle P and heading values relating to the other vehicles that were located at (or near) the location corresponding to the potential wrong-way driving event within a threshold time period (e.g., within the past 30 days and/or the like). In this way, the server device can account for temporary changes in traffic direction (e.g., due to road work and/or the like).

Although not shown, the server device can perform similar comparison(s) of heading values relating to vehicle Q and heading values relating to other vehicles previously located at (or near) the location corresponding to the potential wrong-way driving event associated with vehicle Q to determine whether the potential wrong-way driving event might need to be excluded from further consideration.

Figure 1E:
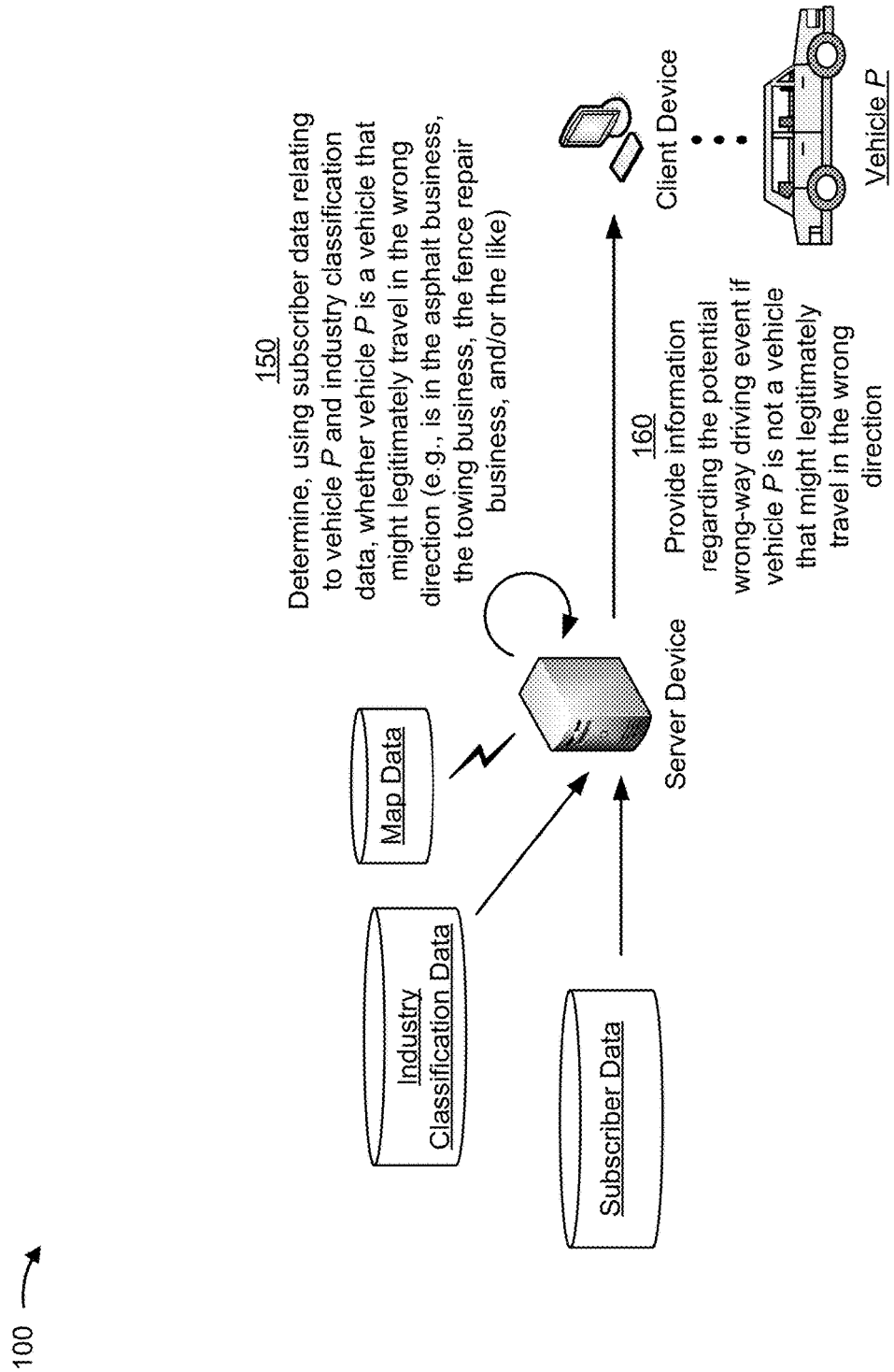

In a case where a vehicle is associated with an industry in which vehicles typically engage in wrong-way driving (e.g., is in the towing business, the asphalt-related business, the fence repair business, and/or the like), the vehicle might legitimately travel in the wrong direction. Thus, in some implementations, the server device can additionally, or alternatively, identify whether a vehicle associated with a potential wrong-way event is associated with an industry in which vehicles typically engage in wrong-way driving to determine whether the potential wrong-way driving event might need to be excluded from further consideration (e.g., to further filter events that are not likely wrong-way driving events). Here, as shown in FIG. 1E, and as shown by reference number 150, the server device can determine, using subscriber data relating to vehicle P and industry classification data, whether vehicle P is a vehicle that might legitimately travel in the wrong direction. For example, the server device can determine whether vehicle P is such a vehicle by determining whether a SIC code, specified in the subscriber data, matches a SIC code included in a predetermined list of SIC codes that are associated with industries in which vehicles typically engage in wrong-way driving. Additionally, or alternatively, and as another example, the server device can determine whether vehicle P is such a vehicle based on a company name specified in the subscriber data (e.g., by determining whether a company name specified in the subscriber data includes word(s) associated with an industry in which vehicles typically engage in wrong-way driving, such as the words "asphalt," "towing," "landscaping," and/or the like).

Although not shown, the server device can similarly determine, using industry classification data and/or subscriber data relating to vehicle Q, whether vehicle Q is a vehicle that might legitimately travel in the wrong direction. For example, in a case where a SIC code, specified in subscriber data relating to vehicle Q, matches a SIC code included in the predetermined list of SIC codes, or where a company name specified in the subscriber data includes word(s) associated with an industry in which vehicles typically engage in wrong-way driving, the server device can exclude the potential wrong-way driving event associated with vehicle Q from further consideration.

As further shown in FIG. 1E, and as shown by reference number 160, the server device can provide information regarding the potential wrong-way driving event associated with vehicle P if vehicle P is not a vehicle that might legitimately travel in the wrong direction. In some implementations, the server device can provide the information (e.g., via a text message, a phone call, or another type of notification) to a driver associated with vehicle P, a fleet manager associated with vehicle P, local authorities responsible for maintaining road markings and/or signage at the location corresponding to the potential wrong-way driving event, a system administrator and/or developer associated with the server device, road signage (e.g., digital signs) within a threshold distance of the location corresponding to the potential wrong-way driving event, other drivers within a threshold distance of the location corresponding to the potential wrong-way driving event, and/or the like. In some implementations, the server device can provide the information as a real-time alert and/or report, as part of periodic notifications, and/or the like. Providing a real-time alert to the driver, for example, can serve to warn the driver that the driver is driving the wrong way, that the driver is at or near a location where one or more other drivers have previously driven the wrong way, and/or the like.

In some implementations, the server device can provide the information to the client device and/or to vehicle P (e.g., to a navigation device located in vehicle P). In some implementations, the server device can provide the information to the client device and/or vehicle P for display via a user interface. In some implementations, the user interface can include a visualization tool that permits a user to view the location of the potential wrong-way driving event on a map—e.g., as a plot of GPS points, relating to vehicle P prior to, during, and/or after the potential wrong-way driving event, with associated information regarding the heading values of vehicle P and corresponding street address information.

In this way, the server device can leverage vehicle data associated with a large quantity of vehicles (e.g., a large fleet base) and across a large network of major roadways to alert drivers and/or fleet managers to wrong-way travel events, which aids drivers in avoiding similar events, and facilitates fleet managers in training drivers on driver safety (thereby reducing the risk of accidents, and reducing a need for fleet managers to expend resources, such as network and/or communication resources that might otherwise be needed in a case where an accident occurs due to a wrong-way travel event (e.g., to mitigate the severity of an accident and/or to dispatch fleet personnel to assist the driver at the location of the accident)). Furthermore, local authorities can be alerted to areas where wrong-way travel events have occurred or are frequent, which permits the local authorities to address any issues there might be with road markings and/or signage (thereby generally improving road safety). Moreover, information regarding potential wrong-way travel events can be provided to nearby road signage (e.g., digital signs) for display to warn other drivers of such events.

As indicated above, FIGS. 1A-1E are provided merely as examples. Other examples are possible and can differ from what was described with regard to FIGS. 1A-1E.

Figure 2:
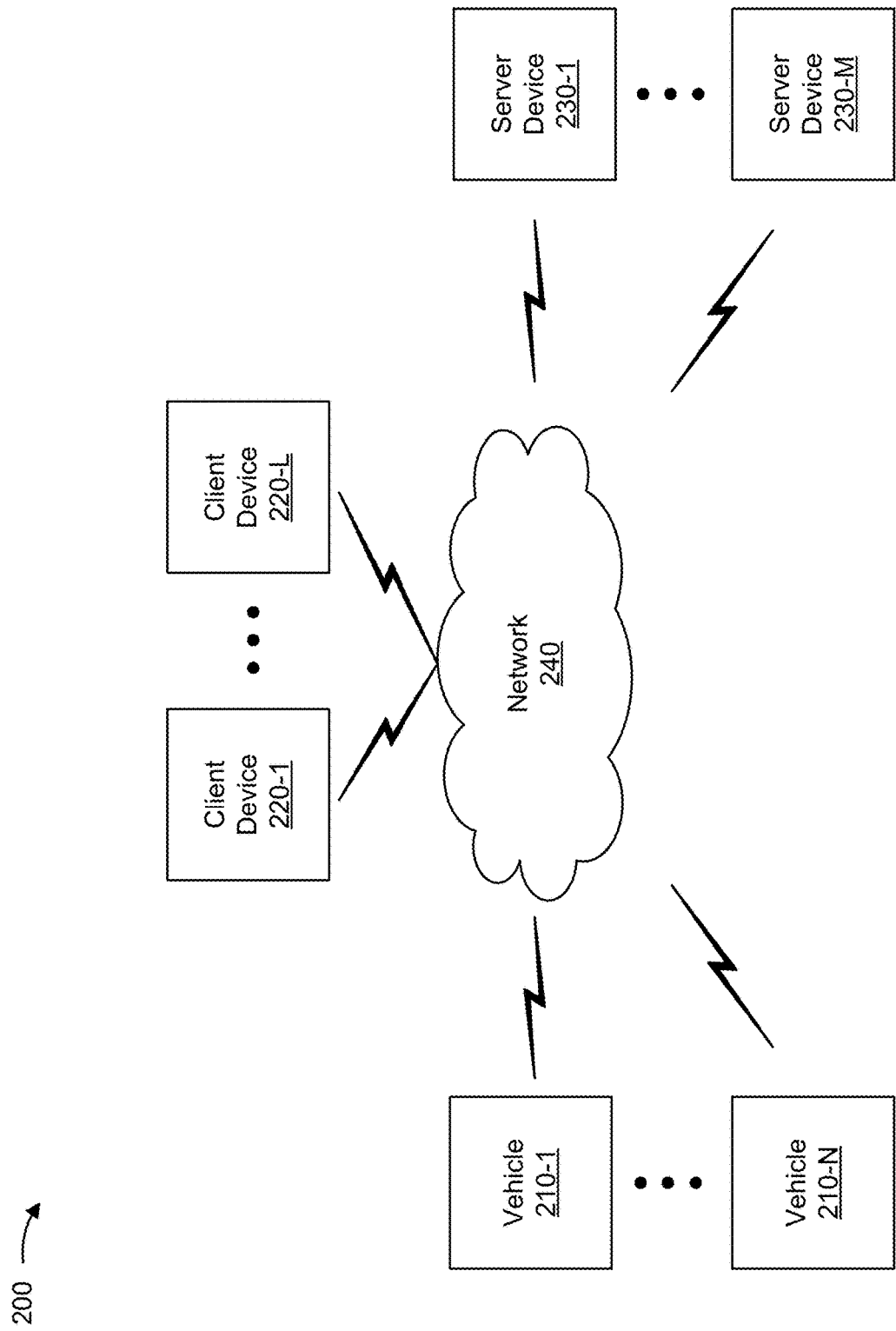
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more vehicles 210-1 through 210-N(N≥1) (hereinafter referred to collectively as "vehicles 210," and individually as "vehicle 210"), one or more client devices 220-1 through 220-L (L≥1) (hereinafter referred to collectively as "client devices 220," and individually as "client device 220"), one or more server devices 230-1 through 230-M (M≥1) (hereinafter referred to collectively as "server devices 230," and individually as "server device 230"), and a network 240. Devices of environment 200 can interconnect via wired connections, wireless connections, or a combination of wired and wireless connections.

Vehicle 210 includes a mobile machine (e.g., that transports people and/or cargo). For example, a vehicle can include a motor vehicle (e.g., a motorcycle, a bus, a car, a truck, etc.), a railed vehicle (e.g., a train or a tram), an electric vehicle (e.g., an electric car or truck), a moped, a scooter, a bicycle, and/or the like. In some implementations, a vehicle can include an autonomous vehicle, such as an autonomous car, an autonomous boat, and/or the like. In practice, there can be thousands, millions, billions, etc. of vehicles 210 communicating data with client device 220 and/or server device 230, which can involve operations on data sets that cannot be managed manually or objectively by a human actor.

Client device 220 includes one or more devices capable of receiving, generating, storing, processing, and/or providing information associated with vehicle 210 and/or server device 230. For example, client device 220 can include a communication and/or computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In practice, there can be thousands, millions, billions, etc. of client devices 220 communicating data with vehicle 210 and/or server device 230, which can involve operations on data sets that cannot be managed manually or objectively by a human actor.

Server device 230 includes one or more devices capable of receiving, storing, providing, generating, and/or processing information associated with vehicle 210 and/or client device 220. For example, server device 230 can include a server device or a group of server devices (e.g., associated with a multi-server micro data center), a workstation computer, a virtual machine (VM) or a group of virtual machines (VMs) implemented by one or more computing devices provided in a cloud computing environment, or a similar type or group of devices. In practice, there can be thousands, millions, billions, etc. of server devices 230 communicating data with vehicle 210 and/or client device 220, which can involve operations on data sets that cannot be managed manually or objectively by a human actor.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
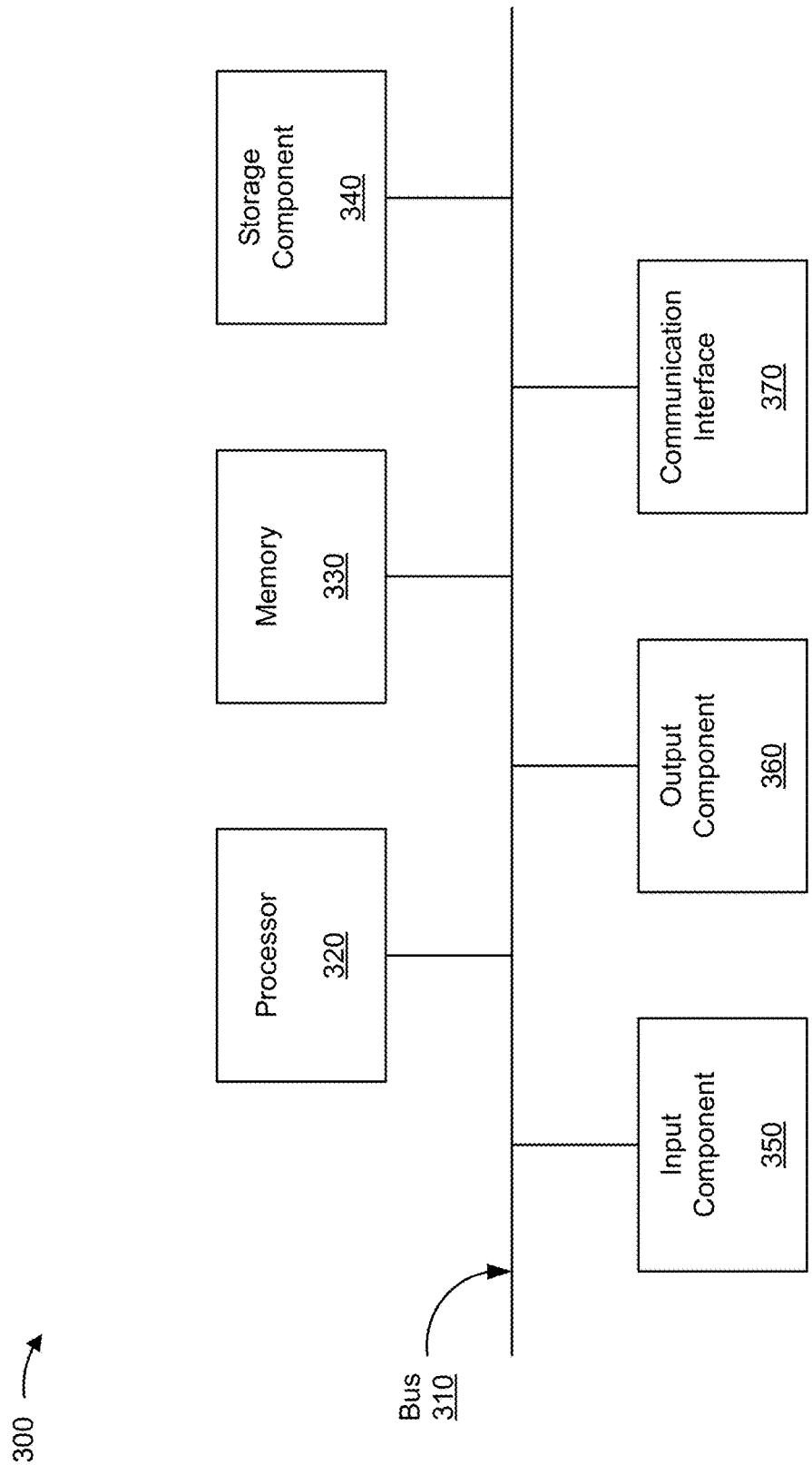
FIG. 3 is a diagram of example components of one or more devices of FIG. 2.

FIG. 3 is a diagram of example components of a device 300. Device 300 can correspond to vehicle 210, client device 220, and/or server device 230. In some implementations, vehicle 210 (or a device associated with vehicle 210), client device 220, and/or server device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a GPS component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
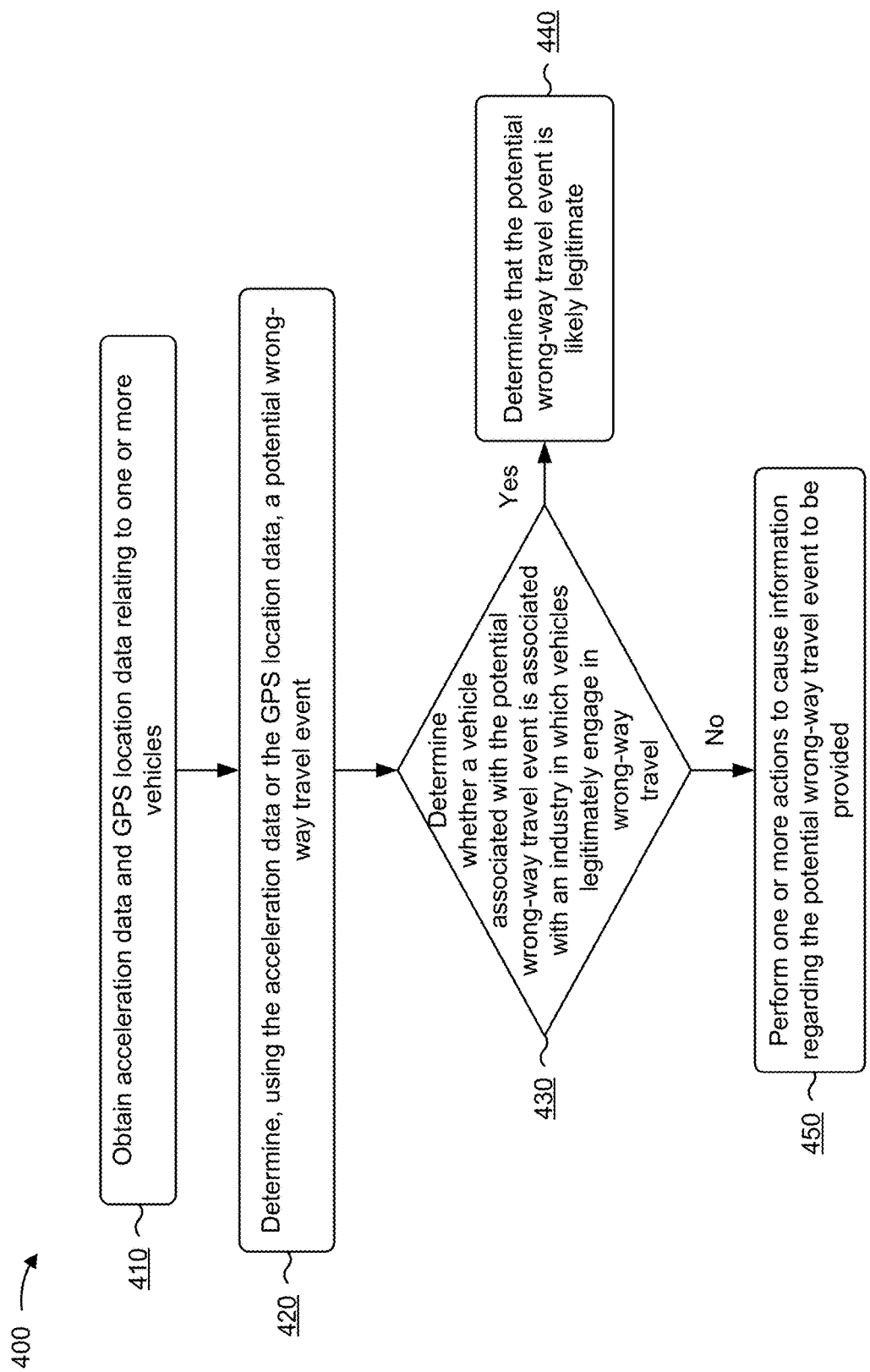
FIG. 4 is a flow chart of an example process for identifying wrong-way travel events.

FIG. 4 is a flow chart of an example process 400 for identifying wrong-way travel events. In some implementations, one or more process blocks of FIG. 4 can be performed by server device 230. In some implementations, one or more process blocks of FIG. 4 can be performed by another device or a group of devices separate from or including server device 230, such as client device 220 and/or vehicle 210.

As shown in FIG. 4, process 400 can include obtaining acceleration data and GPS location data relating to one or more vehicles (block 410). For example, server device 230 can obtain (e.g., using processor 320, communication interface 370, and/or the like) acceleration data and GPS location data relating to one or more vehicles 210. In practice, server device 230 can obtain and operate on thousands, millions, billions, etc. of sets of acceleration data and/or GPS location data, which can involve operations on data sets that cannot be managed manually or objectively by a human actor.

In some implementations, server device 230 can obtain acceleration data and/or GPS location data from one or more data structures (e.g., one or more databases, arrays, tables, linked lists, records, trees, stacks, queues, and/or the like). In some implementations, the data structure(s) can be stored (e.g., in memory) in server device 230. Additionally, or alternatively, the data structures can be stored in another device (e.g., a client device 220), another server device, and/or the like.

In some implementations, the acceleration data and/or the GPS location data can include historical driving-related data and/or real-time (or near real-time) driving-related data provided by one or more devices included in the vehicles (e.g., vehicles 210), such as telematics device(s), including accelerometer(s), global positioning system (GPS) device(s), other vehicle sensors, and/or the like, as described elsewhere herein (e.g., with respect to FIGS. 1A-1E above). In some implementations, server device 230 can receive images captured by roadway sensors (e.g., cameras, such as those installed at or along portions of roadways, included in vehicles traveling on roadways, and/or the like), and analyze the images to determine acceleration data and/or GPS location data of vehicles. In some implementations, another device (e.g., another server device) can determine acceleration data and/or GPS location data based on such images, in which case server device 230 can receive the acceleration data and/or the GPS location data from the other device.

In some implementations, the acceleration data can include acceleration data samples provided by the vehicles (e.g., vehicles 210), and the GPS location data can include GPS location data samples (e.g., in the form of GPS samples) provided by the vehicles (e.g., vehicles 210), as described elsewhere herein (e.g., with respect to FIGS. 1A-1E above).

In this way, server device 230 can obtain acceleration data and GPS location data relating to one or more vehicles to cause server device 230 to determine, using the acceleration data or the GPS location data, a potential wrong-way travel event.

As further shown in FIG. 4, process 400 can include determining, using the acceleration data or the GPS location data, a potential wrong-way travel event (block 420). For example, server device 230 can determine (e.g., using processor 320 and/or the like), using the acceleration data or the GPS location data, a potential wrong-way travel event. In practice, server device 230 can perform thousands, millions, billions, etc. of determinations relating to potential wrong-way travel events. In this way, server device 230 can perform determinations in a manner that cannot be performed manually or objectively by a human actor.

In some implementations, and in a case where the acceleration data (e.g., the acceleration data samples) includes location data represented as GPS coordinates (e.g., latitudes and longitudes) and/or where the GPS location data (e.g., the GPS location data samples) includes location data represented as GPS coordinates, server device 230 can reverse geocode such GPS coordinates, into street addresses, as described elsewhere herein (e.g., with respect to FIGS. 1A-1E above).

In some implementations, server device 230 can identify street addresses (e.g., via text mining) that correspond to major roads (e.g., highways and/or the like) that have one-way portions where wrong-way driving might occur—e.g., by identifying, from the reverse geocoded addresses associated with the acceleration data and/or the GPS location data, street addresses that contain one or more strings or designators corresponding to major roads (e.g., "hwy," "fwy," "I-," "US-," and/or the like for roads in the United States or other appropriate strings or designators for roads in other countries), as described elsewhere herein (e.g., with respect to FIGS. 1A-1E above). In this way, server device 230 can narrow down the acceleration data (e.g., the acceleration data samples) and/or the GPS location data (e.g., the GPS location data samples) to that which is associated with roads that might be prone to wrong-way driving events, thereby conserving processing and/or storage resources that might otherwise be used to process and/or store the filtered-out data (e.g., acceleration data and/or GPS location data).

In some implementations, and in a case where the acceleration data (e.g., the acceleration data samples) includes maximum acceleration or deceleration values, server device 230 can determine potential wrong-way travel event(s) by identifying maximum acceleration or deceleration values that satisfy a threshold (e.g., a threshold that is based on a multiple of the Earth's gravitational force) to enable detection of vehicle crashes, as described elsewhere herein (e.g., with respect to FIGS. 1A-1E above).

Additionally, or alternatively, and in some implementations, server device 230 can determine potential wrong-way travel event(s) by identifying, from the GPS location data, pairs of consecutive GPS location data samples that indicate a reversal of direction, which might be the result of drivers turning vehicles around due to wrong-way driving. For example, server device 230 can identify pairs of consecutive GPS location data samples where a difference, between a first heading value specified in a first sample (of each such pair of consecutive GPS location data samples) and a second heading value specified in a second sample (of the pair of consecutive GPS location data samples), is 180 degrees or is within a threshold quantity of degrees from 180 degrees (e.g., is within a margin of tolerance of plus/minus 15 degrees, 20 degrees, and/or the like from 180 degrees).

In some implementations, server device 230 can identify additional GPS location data samples that are adjacent to each such pair of consecutive GPS location data samples to increase the robustness of the determination. For example, server device 230 can identify four GPS location data samples: the pair of consecutive GPS location data samples, a first adjacent GPS location data sample that immediately precedes the pair of consecutive GPS location data samples, and a second adjacent GPS location data sample that immediately follows the pair of consecutive GPS location data samples. Continuing the example, server device 230 can determine whether a difference, between a heading value specified in the first adjacent sample and a heading value specified in the first sample of the pair of consecutive GPS location data samples, is 0 degrees or is within a threshold quantity of degrees from 0 degrees (e.g., is within a margin of tolerance of plus/minus 5 degrees, 10 degrees, 15 degrees, and/or the like from 0 degrees). Further continuing the example, server device 230 can determine whether a difference, between a heading value specified in the second adjacent sample and a heading value specified in the second sample of the pair of consecutive GPS location data samples, is 0 degrees or is within a threshold quantity of degrees from 0 degrees (e.g., is within a margin of tolerance of plus/minus 5 degrees, 10 degrees, 15 degrees, and/or the like from 0 degrees).

Continuing the previous example, in a case where each GPS location data sample in the GPS location data includes information regarding a distance traveled between GPS location data samples, server device 230 can determine whether a difference, between a distance traveled specified in the first adjacent sample and a distance traveled specified in the first sample of the pair of consecutive GPS location data samples, satisfies a threshold distance (e.g., exceeds a minimum distance), determine whether a difference, between a distance traveled specified in the first sample of the pair of consecutive GPS location data samples and a distance traveled specified in the second sample of the pair of consecutive GPS location data samples, satisfies the threshold, and so on. In some implementations, the value of the threshold distance can depend on a frequency at which the GPS location data is sampled (e.g., which might be different for different vehicles). In a case where a GPS location data sampling frequency is in the order of minutes, the threshold can be set to 100 meters, 150 meters, and/or the like. Verifying that a distance traveled by the vehicle, between samples of the four identified GPS location data samples described above, satisfies the threshold distance can aid server device 230 in filtering out events that are not likely wrong-way travel events (and thus not events of interest), such as where a vehicle travels slowly in a straight (or near straight) line and/or maneuvers about at a roadside stop or stopping area.

Continuing the previous example, in a case where each GPS location data sample in the GPS location data includes a time stamp, server device 230 can determine whether a difference, between a time stamp specified in the first adjacent sample and a time stamp specified in the first sample of the pair of consecutive GPS location data samples, satisfies a threshold time (e.g., is less than or equal to a maximum amount of time), determine whether a difference, between a time stamp specified in the first sample of the pair of consecutive GPS location data samples and a time stamp specified in the second sample of the pair of consecutive GPS location data samples, satisfies the threshold time, and so on. In some implementations, the value of the threshold time can depend on the GPS location data sampling frequency (e.g., the threshold can be set to three minutes, four minutes, and/or the like). Verifying that a time, between samples of the four identified GPS location data samples described above, satisfies the threshold time can further aid server device 230 in filtering out events that are not likely wrong-way travel events (and thus not events of interest), such as where a vehicle exits a road (e.g., a highway) and/or stops for a prolonged period of time between GPS location data samples, thereby conserving processing and/or storage resources that would otherwise be used to process and/or store data relating to the filtered-out events.

In some implementations, server device 230 can determine, for each potential wrong-way travel event (e.g., as determined using the acceleration data samples or the GPS location data samples as described above) and the associated vehicle—a candidate vehicle—whether heading values specified in GPS location data samples relating to one or more other vehicles (other than the candidate vehicle) is consistent with (e.g., is the same as or is within a threshold of) heading value(s) relating to the candidate vehicle. Heading values relating to other vehicle(s) that are consistent with heading value(s) relating to the candidate vehicle would suggest that the event is likely not a wrong-way travel event, in which case server device 230 can exclude the potential wrong-way travel event from further consideration.

In some implementations, server device 230 can compare a median, a mean, and/or the like of heading values, specified in GPS location data samples relating to the one or more other vehicles, and each of one or more heading values, specified in GPS location data samples relating to the candidate vehicle to determine whether the heading of the candidate vehicle (e.g., prior to a reversal of direction of the candidate vehicle and/or prior to a high acceleration/deceleration event) is generally consistent with the headings of the other vehicles (e.g., a majority of the other vehicles) at (or near) the location corresponding to the potential wrong-way travel event.

In some implementations, server device 230 can define (e.g., based on an input by a user, such as a system administrator and/or the like, or another device, such as a management device) a virtual boundary (e.g., a 20 meter by 20 meter virtual boundary, a 25 meter by 25 meter virtual boundary, and/or the like) around the location corresponding to the potential wrong-way travel event, and consider only heading values specified in GPS location data samples relating to vehicle(s) (other than the candidate vehicle) that are and/or were previously located within the virtual boundary, thereby conserving processing and/or storage resources that would otherwise be used to process and/or store the filtered-out heading values.

Additionally, or alternatively, server device 230 can consider only heading values specified in GPS location data samples relating to vehicle(s) (other than the candidate vehicle) that are and/or were previously located at (or near) the location within a threshold time period (e.g., within the past 30 days (e.g., the past calendar month), within the past 2 weeks, and/or the like). This can, for example, account for temporary changes in the direction of traffic (e.g., due to roadwork and/or the like).

Additionally, or alternatively, and in some implementations, server device 230 can analyze the heading values relating to the one or more other vehicles to determine whether the heading values are generally in the same direction. For example, server device 230 can analyze a distribution of the heading values to determine whether an inter-quantile (e.g., a difference between the 75th percentile and the 25th percentile of the distribution of heading values) and/or the like satisfies a threshold (e.g., is less than or equal to 5 degrees, is less than or equal to 10 degrees, is less than or equal to 15 degrees, and/or the like). This can ensure that the location corresponding to the potential wrong-way travel event is not at a crossroad, a narrow two-way highway, and/or the like, in which case the candidate vehicle might not have been traveling in the wrong direction.

In some implementations, server device 230 can provide acceleration data and/or GPS location data as inputs to a machine learning algorithm, which can perform machine learning to automate future detection of potential wrong-way travel events (e.g., that satisfy one or more conditions or thresholds).

In this way, server device 230 can determine, using the acceleration data or the GPS location data, a potential wrong-way travel event to cause server device 230 to determine whether a vehicle associated with the potential wrong-way travel event is associated with an industry in which vehicles legitimately engage in wrong-way travel.

As further shown in FIG. 4, process 400 can include determining whether a vehicle associated with the potential wrong-way travel event is associated with an industry in which vehicles legitimately engage in wrong-way travel (block 430). For example, server device 230 can determine (e.g., using processor 320 and/or the like) whether a vehicle 210 associated with the potential wrong-way travel event is associated with an industry in which vehicles legitimately engage in wrong-way travel. In practice, server device 230 can perform thousands, millions, billions, etc. of determinations relating to vehicles. In this way, server device 230 can perform determinations in a manner that cannot be performed manually or objectively by a human actor.

In some implementations, server device 230 can obtain data regarding the candidate vehicle (e.g., subscriber data (e.g., a name of a company associated with the vehicle and/or the like), industry classification data (e.g., a SIC code, and/or the like), and/or the like), and analyze the data to determine whether the candidate vehicle is associated with one or more industries in which vehicles legitimately engage in wrong-way travel.

In some implementations, in a case where server device 230 obtains information regarding a company name associated with the candidate vehicle, server device 230 can determine whether the company name includes word(s) that are associated with an industry in which vehicles legitimately engage in wrong-way travel (e.g., "tow," "towing," "landscape," "landscaping," "barricade," "pavement," "construction," "fence," "concrete," other variations of such words or text, and/or the like).

In some implementations, in a case where server device 230 obtains industry classification data associated with the vehicle, server device 230 can perform a search (e.g., one or more lookup operations) to determine whether the industry classification data corresponds to an industry in which vehicles legitimately engage in wrong-way travel. For example, in a case where server device 230 receives information regarding a SIC code associated with the candidate vehicle, server device 230 can determine whether the SIC code associated with the candidate vehicle corresponds to a SIC code included in one or more data structures (e.g., one or more databases, arrays, tables, linked lists, records, trees, stacks, queues, and/or the like) that store SIC codes corresponding to industries in which vehicles legitimately engage in wrong-way travel.

Table 1 below is an example list of SIC codes associated with various industries in which vehicles legitimately engage in wrong-way travel.

TABLE 1

| SIC code | Description |
| --- | --- |
| 7549 | Automotive Services-Except Repair |
| 2951 | Paving Materials-Manufacturers |
| 1799 | Special Trade Contractors |
| 1611 | Highway & Street Construction |
| 1771 | Concrete Work |
| . . . | . . . |

In some implementations, the data structure can be stored on server device 230 (e.g., in memory located in server device 230). Additionally, or alternatively, the data structure can be stored on another device (e.g., another server device associated with an entity, such as a government agency, an industry association, and/or the like).

Additionally, or alternatively, and in some implementations, server device 230 can determine whether any other potential wrong-way travel events relating to the candidate vehicle were previously detected (e.g., by server device 230, by another device (such as client device 220), by a user, such as a driver and/or a fleet manager, and/or the like) within a predefined time period, which might indicate that the candidate vehicle frequently (and perhaps legitimately) engages in wrong-way travel. For example, server device 230 can determine whether a quantity of potential wrong-way travel events (e.g., including or excluding a currently identified potential wrong-way travel event), detected in the past month, on one or more days in the past month, and/or the like, satisfies a threshold (e.g., exceeds two potential wrong-way travel events a single day, exceeds three potential wrong-way travel events on a single day, exceeds ten potential wrong-way travel events within a week, and/or the like). Continuing the example, if the quantity of potential wrong-way travel events relating to the candidate vehicle satisfies the threshold, server device 230 can determine that the candidate vehicle frequently (and perhaps legitimately) engages in wrong-way travel, and exclude the identified potential wrong-way travel event from further consideration.

In this way, server device 230 can determine whether a vehicle associated with the potential wrong-way travel event is associated with an industry in which vehicles legitimately engage in wrong-way travel to cause server device 230 to determine that the potential wrong-way travel event is likely legitimate, or to perform one or more actions to cause information regarding the potential wrong-way travel event to be provided.

As further shown in FIG. 4, if the vehicle associated with the potential wrong-way travel event is associated with an industry in which vehicles legitimately engage in wrong-way travel (block 430—YES), process 400 can include determining that the potential wrong-way travel event is likely legitimate (block 440). For example, server device 230 can determine (e.g., using processor 320 and/or the like) that the potential wrong-way travel event is likely legitimate. In practice, server device 230 can perform thousands, millions, billions, etc. of determinations relating to potential wrong-way travel events. In this way, server device 230 can perform determinations relating to potential wrong-way travel events in a manner that cannot be performed manually or objectively by a human actor.

In some implementations, server device 230 can exclude the potential wrong-way travel event from further consideration. In some implementations, server device 230 can associate information with the potential wrong-way travel event that indicates that the potential wrong-way travel event is/was likely intentional and/or the like.

As further shown in FIG. 4, if the vehicle associated with the potential wrong-way travel event is not associated with an industry in which vehicles legitimately engage in wrong-way travel (block 430—NO), process 400 can include performing one or more actions to cause information regarding the potential wrong-way travel event to be provided (block 450). For example, server device 230 can perform (e.g., using processor 320, memory 330, storage component 340, communication interface 370, and/or the like) one or more actions to cause information regarding the potential wrong-way travel event to be provided. In some implementations, server device 230 can perform one or more actions to cause information regarding the potential wrong-way travel event to be provided to a client device (e.g., a client device 220), the candidate vehicle (e.g., a vehicle 210), a device associated with the candidate vehicle (e.g., a navigation device located in a vehicle 210), and/or the like. In practice, server device 230 can perform action(s) relating to thousands, millions, billions, etc. of potential wrong-way travel events. In this way, server device 230 can perform actions relating to potential wrong-way travel events in a manner that cannot be performed manually or objectively by a human actor.

Figure 5:
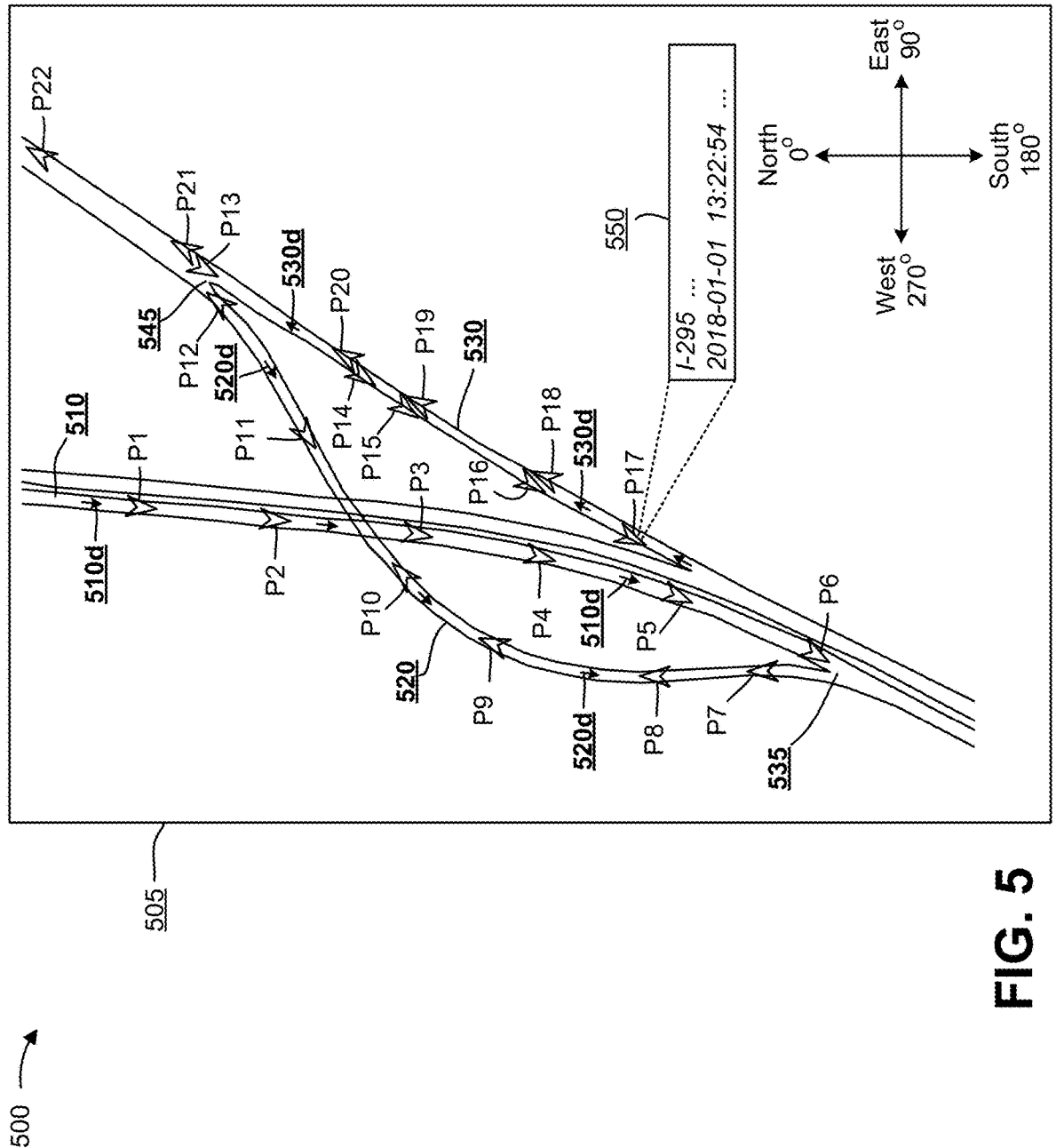
FIGS. 5 and 6 are diagrams of example implementations relating to the example process shown in FIG. 4.

In some implementations, server device 230 can provide the information regarding the potential wrong-way travel event for display on a user interface presented on a client device (e.g., a client device 220), a device associated with the candidate vehicle (e.g., a navigation device located in a vehicle 210), and/or the like. In some implementations, the user interface can permit a user to view the location corresponding to the potential wrong-way travel event on a map. In some implementations, the information regarding the potential wrong-way travel event can include heading values (e.g., information regarding headings) relating to the candidate vehicle, and associated GPS coordinates (e.g., respective location data corresponding to each of the headings), which can be represented as points on the map. In some implementations, the user interface can permit a user to zoom in and/or zoom out of the map, and to select one or more of the displayed points for information regarding such points (e.g., an associated time stamp, a street address of the location represented by the selected point (e.g., obtained via reverse geocoding), and/or the like displayed in one or more pop-up windows and/or the like). In some implementations, the user interface can present the heading values relating to the candidate vehicle using a visualization scheme. For example, the user interface can provide a visual representation of the heading values using arrow symbols, pointer symbols, and/or the like to illustrate the direction of the candidate vehicle at each point. An example implementation of the user interface is shown in FIG. 5, and described in more detail below.

Figure 6:
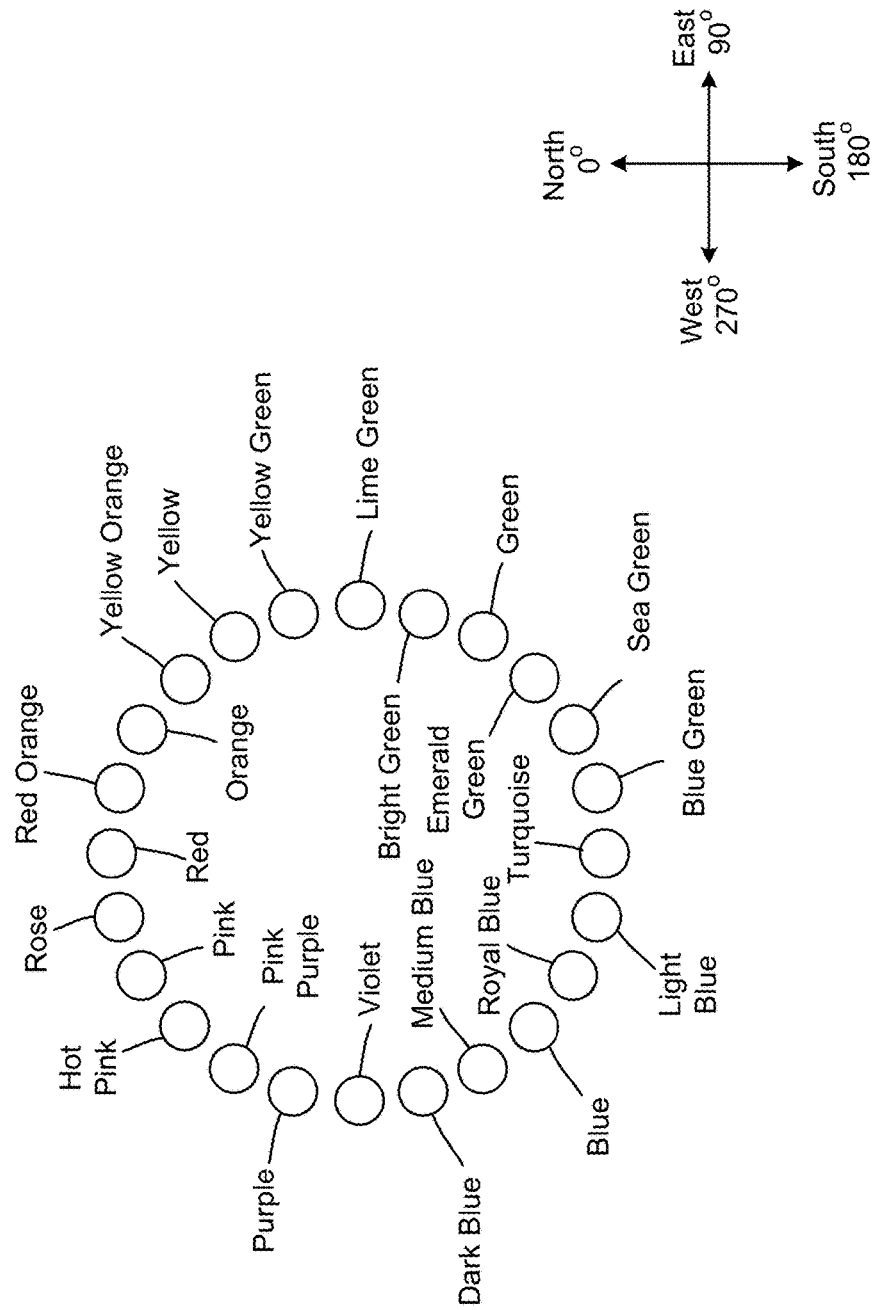

As another example, and in some implementations, the user interface can display the heading information based on a color coding scheme, where different colors represent different headings of the candidate vehicle. An example implementation of a color coding scheme is shown in FIG. 6, and described in more detail below.

In this way, a user (e.g., a driver associated with a candidate vehicle, a fleet manager associated with a candidate vehicle, a system administrator and/or developer associated with server device 230, and/or the like) can view a path of travel and the headings of the candidate vehicle prior to, during, and/or subsequent to the potential wrong-way travel event, determine whether the candidate vehicle indeed engaged in wrong-way travel, and perform one or more actions as needed—e.g., a system administrator and/or a system developer can refine one or more criteria for identifying potential wrong-way travel events, a driver and/or a fleet manager associated with the candidate vehicle can determine the severity of the potential wrong-way travel event and take precautions in future travels, other drivers in or near an area of a potential wrong-way travel event can be notified (e.g., by automated phone calls, text messages, and/or the like) of such an event, autonomous (or semi-autonomous) vehicles in or near an area of a potential wrong-way travel event can be notified of such an event and/or instructed or controlled to perform one or more actions (e.g., to pull off to the side of the road), road signage (e.g., digital displays) can present warnings of potential wrong-way travel events nearby, roadway sensors (e.g., installed on portions of roadways) can be instructed to capture data to verify potential wrong-way travel events, and/or the like.

In this way, server device 230 can perform one or more actions to cause information regarding the potential wrong-way travel event to be provided.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel. Furthermore, although blocks of process 400 have been described in a particular order, in some implementations, process 400 can perform the functions associated with the blocks in a different order, such as any order appropriate to narrow down data associated with vehicle travel to identify potential wrong-way travel events. By way of example, process 400 can include filtering out of data for vehicles that are associated with industries in which vehicles legitimately engage in wrong-way travel prior to determining potential wrong-way travel events based on acceleration data (e.g., acceleration data samples) and/or GPS location data (e.g., GPS location data samples).

FIG. 5 is a diagram of an example implementation 500 relating to example process 400 shown in FIG. 4. As shown in FIG. 5, example implementation 500 can include a user interface 505 that displays a path of travel of a vehicle (e.g., a vehicle 210), associated with a potential wrong-way travel event, on a map.

As shown in FIG. 5, the vehicle travels along a road section 510, a road section 520, and a road section 530. As shown, road section 510 can be joined to road section 520 at a location 535, and road section 520 can be joined to road section 530 at a location 545. As shown, the direction of traffic (shown by arrows 510d) for road section 510 is generally southward, the direction of traffic (shown by arrows 520d) for road section 520 is generally southward/southwestward, and the direction of traffic (shown by arrows 530d) for road section 530 is generally northeastward.

As shown, points along the path of the vehicle are represented by symbols P1 through P22 (e.g., each shown as a GPS arrow icon), which illustrate the location and the heading of the vehicle at the different points. As shown by symbols P1 to P6, the vehicle travels southward on road section 510. Thereafter, the vehicle makes a sharp right turn at location 535 and, as shown by symbols P7 to P10, travels northward/northeastward (the wrong way) on road section 520. As shown by symbol P11, the vehicle reverses direction and heads southwestward on road section 520, suggesting that a driver of the vehicle likely realized that the driver was traveling against the direction of traffic on road section 520, and turned the vehicle around. The vehicle again reverses direction and, as shown by symbol P12, continues northeastward on road section 520, suggesting that the driver decided to nevertheless travel against the direction of traffic until reaching an end of road section 520.

As shown by symbol P13, the vehicle travels southwestward (the wrong way) on road section 530 (likely after making a sharp right turn at location 545). As shown by symbols P14 to P17, the vehicle continues traveling southwestward on road section 530. As shown by symbol P18, the vehicle travels northeastward, suggesting that the driver likely realized that the driver was traveling against the direction of traffic on road section 530, and turned the vehicle around. Subsequently, and as shown by symbols P19 to P22, the vehicle travels in the direction of traffic (northeastward) on road section 530.

In some implementations, user interface 505 can permit a user to select one or more points on the map for information regarding the vehicle at such points. As shown by reference number 550, for example, the user interface can present (e.g., based on a user selection) information regarding the point represented by symbol P17, including street address information, time stamp information, and/or the like.

In this way, a user can view a path of travel and the directions of a vehicle, associated with a potential wrong-way travel event, prior to, during, and/or subsequent to the potential wrong-way travel event, determine whether the vehicle indeed engaged in wrong-way travel, and perform one or more actions as needed, as described elsewhere herein (e.g., with respect to block 450 above).

As indicated above, FIG. 5 is provided merely as an example. Other examples are possible and can differ from what was described with regard to FIG. 5.

FIG. 6 is a diagram of an example implementation 600 relating to example process 400 shown in FIG. 4. As shown in FIG. 6, example implementation 600 can include a color coding scheme that is implemented as a pattern of colors (colors not shown, although specified via textual descriptions) corresponding to different directions (e.g., north (0 degrees), east (90 degrees), etc.). As shown, the colors in the circular pattern can change gradually along a clockwise (or counterclockwise) direction. Although example implementation 600 is shown to include a color coding scheme that involves the use of certain colors, other colors can additionally, or alternatively, be used.

As described above with respect to block 450 of FIG. 4, a color coding scheme, such as the color coding scheme shown in FIG. 6, can be used to visually represent different headings of a candidate vehicle on a map. For example, in addition to, or as an alternative to, utilizing GPS arrow icons to represent headings of a candidate vehicle (e.g., as shown in FIG. 5), symbols (e.g., circles, squares, triangles, and/or any other shape) colored according to the color coding scheme shown in FIG. 6 can be used to represent the various headings of the candidate vehicle.

As indicated above, FIG. 6 is provided merely as an example. Other examples are possible and can differ from what was described with regard to FIG. 6.

Some implementations, described herein, provide a server device 230 that is capable of analyzing and filtering a large set of vehicle acceleration data or GPS location data, based on threshold values, street address information, vehicle industry classifications, and/or subscriber information to identify wrong-way travel events. In some implementations, server device 230 is capable of providing information regarding identified wrong-way travel events to the associated drivers, to fleet manager(s) associated with the drivers, to local authorities associated with locations relating to the identified wrong-way travel events, and/or the like. In this way, drivers and/or fleet managers can be alerted to wrong-way travel events, which aids drivers in avoiding similar events, and facilitates fleet managers in training drivers on driver safety (thereby reducing the risk of accidents, and reducing a need for fleet managers to expend resources, such as network and/or communication resources that might otherwise be needed in a case where an accident occurs due to a wrong-way travel event (e.g., to mitigate the severity of an accident and/or to dispatch fleet personnel to assist the driver at the location of the accident)). In addition, this aids drivers in remaining on an intended route, which conserves energy (e.g., fuel) that would otherwise be wasted from wrong-way travel. Furthermore, local authorities can be alerted to areas where wrong-way travel events have occurred or are frequent, which permits the local authorities to address any issues there might be with road markings and/or signage (thereby generally improving road safety).

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
   obtaining, by a device, GPS location data,
      the GPS location data including a plurality of GPS location data samples relating to a plurality of vehicles,
         wherein the plurality of GPS location data samples indicate a change in heading that is associated with wrong-way travel, and
         the plurality of GPS location data samples including first heading values relating to a potential wrong-way travel event associated with a vehicle of the plurality of vehicles;
   determining, by the device and from a plurality of second heading values relating to other vehicles that were previously located near a location corresponding to the potential wrong-way travel event, a mean heading value or median heading value;
   determining, by the device, that at least one of the first heading values is substantially opposite the mean heading value or the median heading value;
   determining, by the device, the potential wrong-way travel event based on determining that the at least one of the first heading values is substantially opposite the mean heading value or the median heading value; and
   performing, by the device, one or more actions to cause information regarding the potential wrong-way travel event to be provided to a user device based on determining the potential wrong-way travel event.

2. The method of claim 1, wherein the plurality of GPS location data samples are periodically obtained from the plurality of vehicles,
   each of the plurality of GPS location data samples including at least one GPS coordinate and at least one heading value.

3. The method of claim 1, wherein determining the potential wrong-way travel event further comprises:
   accessing map data based on the plurality of GPS location data samples;
   identifying, based on the map data and the plurality of GPS location data samples, street data identifying whether a street associated with the vehicle is a one-way street; and
   determining the potential wrong-way travel event further based on the street data and the first heading values.

4. The method of claim 1, wherein determining the potential wrong-way travel event further comprises:
   determining that a pair of consecutive GPS location data samples, of the plurality of GPS location data samples, relating to the vehicle includes third heading values that indicate a reversal of direction of the vehicle; and
   determining the potential wrong-way travel event further based on determining that the pair of consecutive GPS location data samples relating to the vehicle includes the third heading values that indicate the reversal of the direction of the vehicle.

5. The method of claim 1, further comprising:
   obtaining acceleration data,
   the acceleration data including a plurality of acceleration data samples relating to one or more vehicles of the plurality of vehicles; and
   wherein determining the potential wrong-way travel event further comprises:
      determining the potential wrong-way travel event further based on the acceleration data.

6. The method of claim 5, wherein determining the potential wrong-way travel event further based on the acceleration data comprises:
- determining that at least one acceleration data sample, of the plurality of acceleration data samples, satisfies a threshold; and
- determining the potential wrong-way travel event further based on determining that the at least one acceleration data sample satisfies the threshold.

7. A device, comprising:
- one or more memories; and
- one or more processors communicatively coupled to the one or more memories, configured to:
    - obtain GPS location data,
        - the GPS location data including a plurality of GPS location data samples relating to a plurality of vehicles,
            - wherein the plurality of GPS location data samples indicate a change in heading that is associated with wrong-way travel, and
            - the plurality of GPS location data samples including first heading values relating to a potential wrong-way travel event associated with a vehicle of the plurality of vehicles;
    - determine, from a plurality of second heading values relating to other vehicles that were previously located near a location corresponding to the potential wrong-way travel event, a mean heading value or median heading value;
    - determine that at least one of the first heading values is substantially opposite the mean heading value or the median heading value;
    - determine the potential wrong-way travel event based on determining that the at least one of the first heading values is substantially opposite the mean heading value or the median heading value; and
    - perform one or more actions to cause information regarding the potential wrong-way travel event to be provided to a user device based on determining the potential wrong-way travel event.

8. The device of claim 7, wherein the plurality of GPS location data samples are periodically obtained from the plurality of vehicles,
- each of the plurality of GPS location data samples including at least one GPS coordinate and at least one heading value.

9. The device of claim 7, wherein the one or more processors, when determining the potential wrong-way travel event, are further configured to:
- access map data based on the plurality of GPS location data samples;
- identify, based on the map data and the plurality of GPS location data samples, street data identifying whether a street associated with the vehicle is a one-way street; and
- determine the potential wrong-way travel event further based on the street data and the first heading values.

10. The device of claim 7, wherein the one or more processors, when determining the potential wrong-way travel event, are further configured to:
- determine that a pair of consecutive GPS location data samples, of the plurality of GPS location data samples, relating to the vehicle includes third heading values that indicate a reversal of direction of the vehicle; and
- determine the potential wrong-way travel event further based on determining that the pair of consecutive GPS location data samples relating to the vehicle includes the third heading values that indicate the reversal of the direction of the vehicle.

11. The device of claim 7, wherein the one or more processors are further configured to:
- obtain acceleration data,
    - the acceleration data including a plurality of acceleration data samples relating to one or more vehicles of the plurality of vehicles; and
- wherein the one or more processors, when determining the potential wrong-way travel event, are further configured to:
    - determine the potential wrong-way travel event further based on the acceleration data.

12. The device of claim 11, wherein the one or more processors, when determining the potential wrong-way travel event further based on the acceleration data, are configured to:
- determine that at least one acceleration data sample, of the plurality of acceleration data samples, satisfies a threshold; and
- determine the potential wrong-way travel event further based on determining that the at least one acceleration data sample satisfies the threshold.

13. A non-transitory computer-readable medium storing instructions, the instructions comprising:
- one or more instructions that, when executed by one or more processors, cause the one or more processors to:
    - obtain GPS location data,
        - the GPS location data including a plurality of GPS location data samples relating to a plurality of vehicles,
            - wherein the plurality of GPS location data samples indicate a change in heading that is associated with wrong-way travel, and
            - the plurality of GPS location data samples including first heading values relating to a potential wrong-way travel event associated with a vehicle of the plurality of vehicles;
    - determine, from a plurality of second heading values relating to other vehicles that were previously located near a location corresponding to the potential wrong-way travel event, a mean heading value or median heading value;
    - determine that at least one of the first heading values is substantially opposite the mean heading value or the median heading value;
    - determine the potential wrong-way travel event based on determining that the at least one of the first heading values is substantially opposite the mean heading value or the median heading value; and
    - perform one or more actions to cause information regarding the potential wrong-way travel event to be provided to a user device based on determining the potential wrong-way travel event.

14. The non-transitory computer-readable medium of claim 13, wherein the plurality of GPS location data samples are periodically obtained from the plurality of vehicles,
- each of the plurality of GPS location data samples including at least one GPS coordinate and at least one heading value.

15. The non-transitory computer-readable medium of claim 13, wherein the one or more instructions, that cause the one or more processors to determine the potential wrong-way travel event further, cause the one or more processors to:
- access map data based on the plurality of GPS location data samples;
- identify, based on the map data and the plurality of GPS location data samples, street data identifying whether a street associated with the vehicle is a one-way street; and
- determine the potential wrong-way travel event further based on the street data and the first heading values.

16. The non-transitory computer-readable medium of claim 13, wherein the one or more instructions, that cause the one or more processors to determine the potential wrong-way travel event further, cause the one or more processors to:
- determine that a pair of consecutive GPS location data samples, of the plurality of GPS location data samples, relating to the vehicle includes third heading values that indicate a reversal of direction of the vehicle; and
- determine the potential wrong-way travel event further based on determining that the pair of consecutive GPS location data samples relating to the vehicle includes the third heading values that indicate the reversal of the direction of the vehicle.

17. The non-transitory computer-readable medium of claim 13, wherein the one or more instructions, when executed by the one or more processors, further cause the one or more processors to:
- obtain acceleration data,
  - the acceleration data including a plurality of acceleration data samples relating to one or more vehicles of the plurality of vehicles; and
- wherein the one or more instructions, that cause the one or more processors to determine the potential wrong-way travel event further, cause the one or more processors to:
  - determine the potential wrong-way travel event further based on the acceleration data.

18. The non-transitory computer-readable medium of claim 17, wherein the one or more instructions, that cause the one or more processors to determine the potential wrong-way travel event further based on the acceleration data, further cause the one or more processors to:
- determine that at least one acceleration data sample, of the plurality of acceleration data samples, satisfies a threshold; and
- determine the potential wrong-way travel event further based on determining that the at least one acceleration data sample satisfies the threshold.

19. The method of claim 1, wherein the information regarding the potential wrong way travel event comprises:
- at least one heading value associated with the vehicle, or
- at least one GPS coordinate associated with the vehicle.

20. The device of claim 7, wherein the information regarding the potential wrong way travel event comprises:
- at least one heading value associated with the vehicle, or
- at least one GPS coordinate associated with the vehicle.

* * * * *